(12) United States Patent
Nishiyama

(10) Patent No.: US 8,492,663 B2
(45) Date of Patent: Jul. 23, 2013

(54) ELECTRONIC PART HOUSING BOX

(75) Inventor: Noritaka Nishiyama, Makinohara (JP)

(73) Assignee: Yazaki Corporation, Tokyo (JP)

( * ) Notice: Subject to any disclaimer, the term of this patent is extended or adjusted under 35 U.S.C. 154(b) by 166 days.

(21) Appl. No.: 12/869,251

(22) Filed: Aug. 26, 2010

(65) Prior Publication Data

US 2011/0048794 A1 Mar. 3, 2011

(30) Foreign Application Priority Data

Aug. 28, 2009 (JP) ................................. P2009-198246

(51) Int. Cl.
*H05K 7/14* (2006.01)

(52) U.S. Cl.
USPC .......................................... 174/545; 174/551

(58) Field of Classification Search
USPC ................... 439/76.2; 174/545, 551
See application file for complete search history.

(56) References Cited

U.S. PATENT DOCUMENTS

| | | | |
|---|---|---|---|
| 2006/0073738 A1* | 4/2006 | Nagaoka et al. | 439/721 |
| 2010/0232130 A1* | 9/2010 | Kodama | 361/811 |

FOREIGN PATENT DOCUMENTS

| | | |
|---|---|---|
| CN | 1983475 A | 6/2007 |
| JP | 2009-140690 | 6/2009 |

OTHER PUBLICATIONS

Office Action mailed on Mar. 26, 2013 from the Chinese Patent Office in counterpart Chinese Patent Application No. 101010267165.7 (6 pages).

* cited by examiner

*Primary Examiner* — Hung Ngo
(74) *Attorney, Agent, or Firm* — Finnegan, Henderson, Farabow, Garrett & Dunner, LLP

(57) ABSTRACT

In an electronic part housing box 1 which includes a capacitor 2 having lead wires 2b protruded from the capacitor main body 2a, a base member 10 having a part housing chamber 11 for housing the capacitor main body 2a, a part housing cover 20 attached to the base member 10 to thereby cover the opening of the part housing chamber 11, and a bracket 40 attached to the base member 10 to thereby fix the lead wires 2b, the base member 10 is integrally provided with a first spring portion 14 for biasing the capacitor main body 2a toward the opening side of the part housing chamber 11 and the part housing cover 20 is integrally provided with a second spring portion 21 for biasing the capacitor main body 2a toward the bottom surface side of the part housing chamber 11.

4 Claims, 9 Drawing Sheets

ELECTRONIC PART HOUSING BOX

BACKGROUND

1. Field of the Invention

The present invention relates to an electronic part housing box in which electronic parts with lead wires are housed.

2. Description of the Related Art

Various kinds of noises may be inputted via electric wires into various kinds of sensors etc. mounted in an automobile, for example. When such noises are inputted into the sensors etc., the sensors etc. may cause erroneous operations. Thus, an electronic part housing box as a noise measure is sometimes attached to electric wires wired in an automobile etc. An example of such the electronic part housing box of the related art is shown in FIGS. 7 to 9.

In FIGS. 7 to 9, an electronic part housing box 100 includes two capacitors 101 as electronic parts, a base member 102 for housing the capacitors 101, a part housing cover 103 attached to the member 102, two electric wire supporting members 104 attached to the base member 102 and a bracket 110 as a conductive member to be attached to the base member 102.

Each of the capacitors 101 is configured by a capacity main body 101a as a part main body and a pair of lead wires 101b protruded from the capacity main body 101a. The base member 102 is provided with a part housing chamber 102a and two electric wire housing chambers 102b disposed at the both sides thereof. The two capacitors 101 are housed in the part housing chamber 102a in a vertically laminated state. Electric wires (not shown) are penetrated through each of the electric wire housing chambers 102b. Each of the electric wires (not shown) is provided with a crimp-type terminal (not shown) which is arranged to be conductive between the electric wire and this terminal.

Each of the electric wire supporting members 104 is disposed so as to support both the electric wire (not shown) and the crimp-type terminal (not shown) and to close the opening of the electric wire housing chamber 102b.

In each of the electric wire housing chambers 102b, the ground terminal portion 110a for the bracket 110 is disposed and a relay terminal for the electric wire (not shown) is housed. The electric wire relay terminal (not shown) is fitted into the crimp-type terminal (not shown) during a process of housing the electric wire. Thus, the electric wire (not shown) is electrically coupled to the electric wire relay terminal (not shown) via the crimp-type terminal (not shown). The bracket 110 is fixed to a vehicle body.

The pair of lead wires 101b of each of the capacitors 101 are selectively introduced into the two electric wire housing chambers 102b, respectively. The pair of lead wires 101b of each of the capacitors 101 are fixed to the ground terminal portion 110a for the bracket 110 and the electric wire relay terminal (not shown) within the electric wire housing chambers 102b, respectively. According to such the arrangement, since the capacitor 101 is disposed between each of the electric wires (not shown) and the ground, even when noise is superimposed on an electric signal transmitted through each of the electric wires (not shown), the noise can be eliminated by the capacitor 101 utmostly.

Patent Document 1: JP-A-2009-140690

The height of the part housing chamber 102a of the base member 102 is set based on the height of the capacity main body 101a of the capacitor having the maximum height thereof among respective capacitors. Thus, when the capacity main body 101a having a height smaller than the maximum height is housed, the capacity main body 101a is housed in a state of having a gap within the part housing chamber 102a.

Thus, the capacity main body 101a vibrates easily due to the vibration being transmitted thereto. When the capacity main body 101a vibrates, a large load is applied to the portion of lead wire 101b fixed to the bracket 110 etc., so that there arises such a problem that the lead wire 101b is broken. Such the problem also arises in the case where an electronic part other than the capacitor 101 is housed.

SUMMARY

The invention is achieved in order to solve the aforesaid problem and an object of the invention is to provide an electronic part housing box which can suppress the vibration of a part main body utmostly.

A first aspect of the invention is arranged in a manner that in an electronic part housing box, including: an electronic part which has a lead wire protruded from a main body of the part; a base member which has a part housing chamber for housing the part main body; a part housing cover which is attached to the base member so as to cover an opening of the part housing chamber; and a conductive member which is attached to the base member so as to fix the lead wire, the base member is provided with a first spring portion which biases the part main body toward the opening side of the part housing chamber.

A second aspect of the invention is arranged in a manner that in the electronic part housing box according to the first aspect of the invention, the first spring portion is integrally provided with the base member.

A third aspect of the invention is arranged in a manner that in the electronic part housing box according to the first aspect, the part housing cover is provided with a second spring portion for biasing the part main body toward a bottom surface side of the part housing chamber.

A fourth aspect of the invention is arranged in a manner that in the electronic part housing box according to the third aspect of the invention, the second spring portion is integrally provided with the part housing cover.

According to the first aspect of the invention, when capacitors of the maximum housing number are housed in the part housing chamber, the capacity main bodies can be housed within the part housing chamber without causing any gap substantially due to the biasing force of the first spring portion even in the case where the capacitors which each capacity main body has a height smaller than the maximum size are housed. Also, eve in the case where the capacitors of the number less than the maximum housing number are housed in the part housing chamber, the vibration can be suppressed as compared with the example of the related art where the capacitor is housed in a free state without acting any biasing force thereon. Accordingly, the invention can suppress the vibration of the part main bodies utmostly.

According to the second aspect of the invention, in addition to the effects of the invention of the first aspect of the invention, the vibration of the part main bodies can be suppressed utmostly without increasing the number of parts.

According to the third aspect of the invention, in addition to the effects of the invention of the first aspect of the invention, in the case where capacitors of the maximum housing number are housed in the part housing chamber and further when the capacitors which each capacity main body has a height smaller than the maximum size are housed, the capacity main bodies are respectively disposed at positions where the biasing force of the first spring portion and the biasing force of the second spring portion are balanced, the vibration of the part main bodies can be further suppressed.

According to the fourth aspect of the invention, in addition to the effects of the invention of the third aspect, the vibration of the part main bodies can be suppressed utmostly without increasing the number of parts.

DETAILED DESCRIPTION

Hereinafter, an embodiment of the invention will be explained with reference to drawings.

Figure 1:
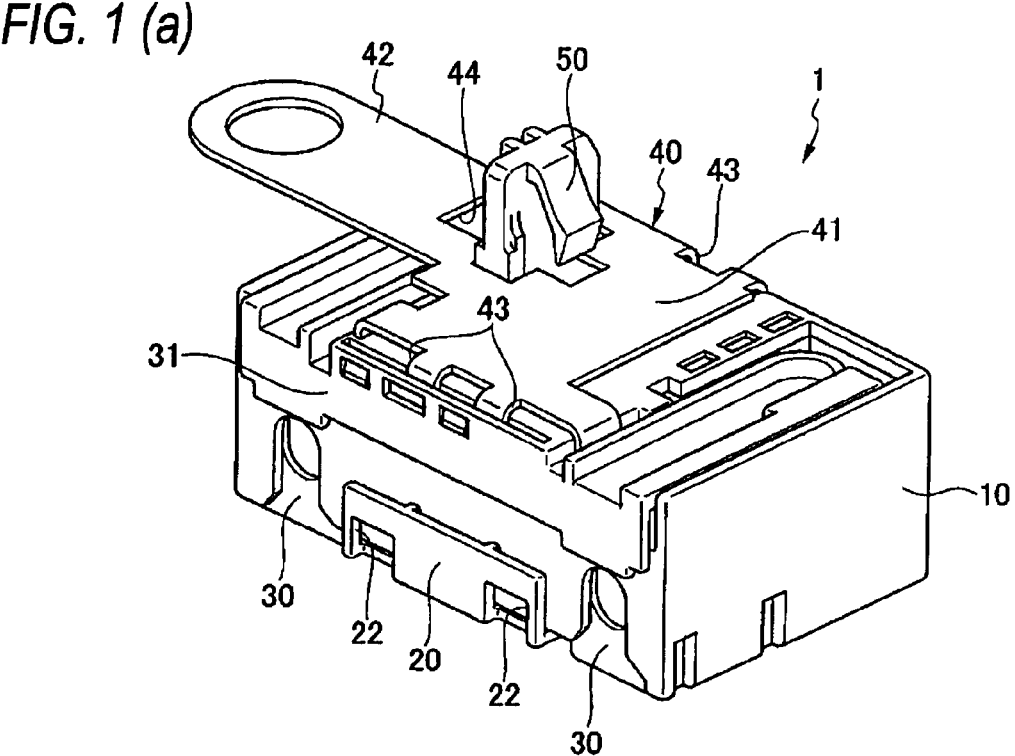
FIG. 1 are diagrams showing an embodiment of the invention, in which (a) is a perspective view of an electronic part housing box seen from the bottom surface side thereof and (b) is a perspective view of the electronic part housing box seen from the upper surface side thereof.
Figure 1:
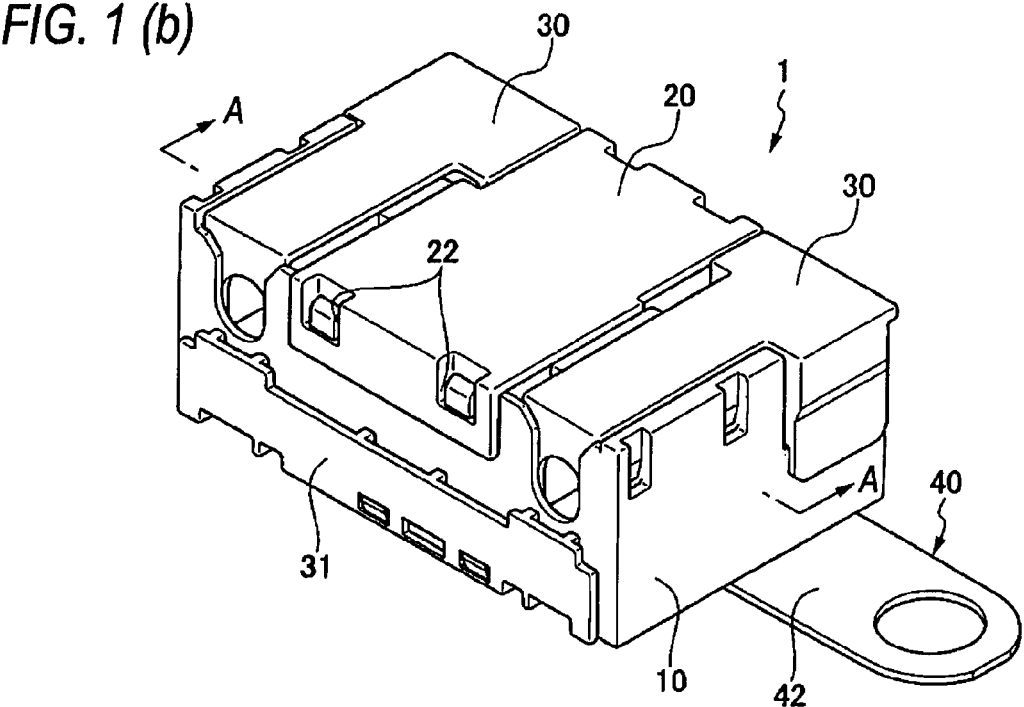
Figure 2:
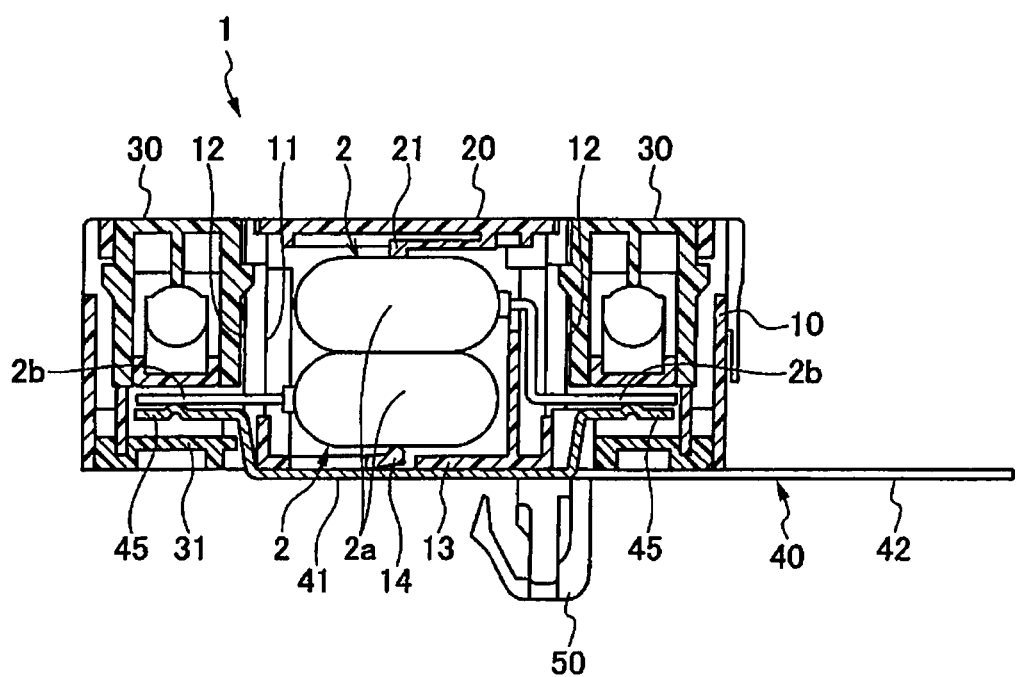
FIG. 2 is a sectional view cut along a line A-A in FIG. 1(b) according to the embodiment of the invention.
Figure 3:
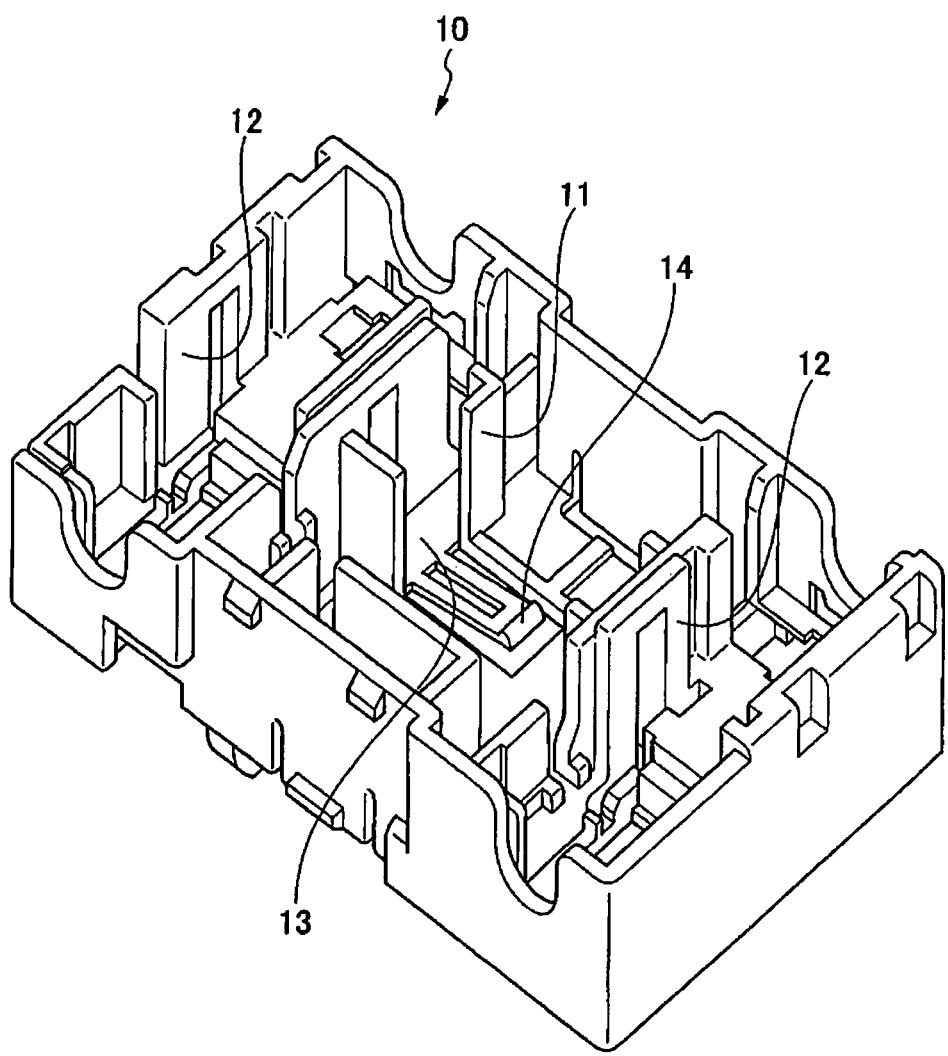
FIG. 3 is a perspective view of a base member according to the embodiment of the invention.
Figure 4:
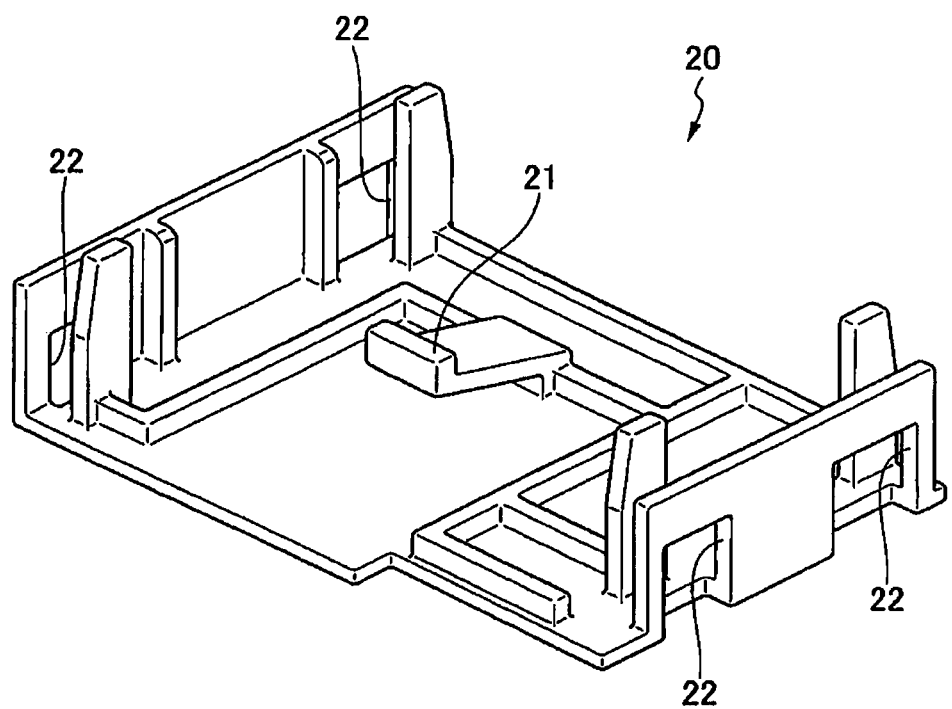
FIG. 4 is a perspective view of a part housing cover according to the embodiment of the invention.
Figure 5:
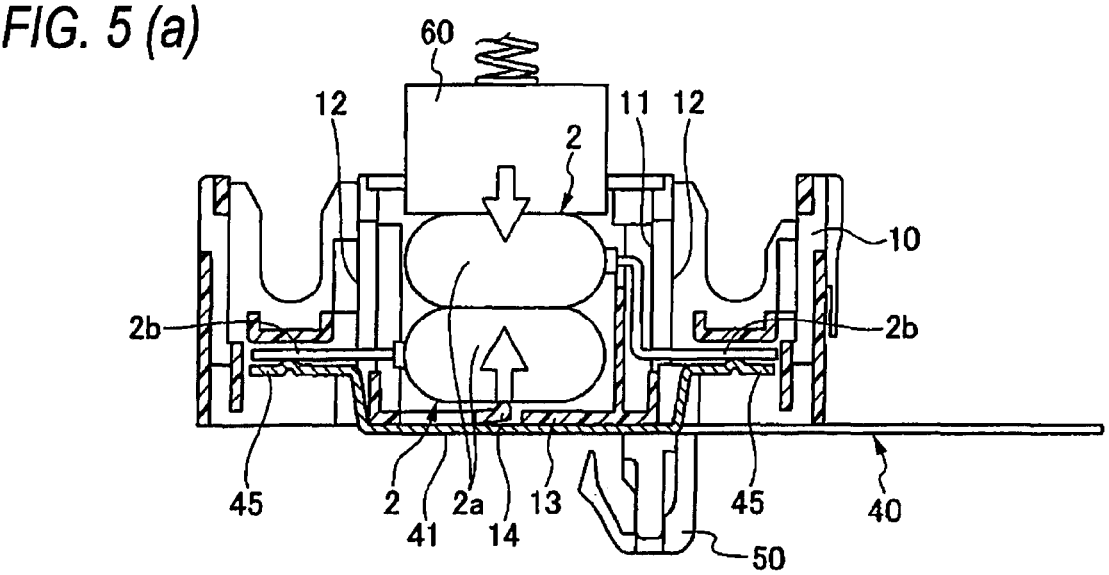
FIG. 5 are diagrams showing the embodiment of the invention, in which (a) to (c) are sectional diagrams showing respective processes for housing two capacitors.
Figure 5:
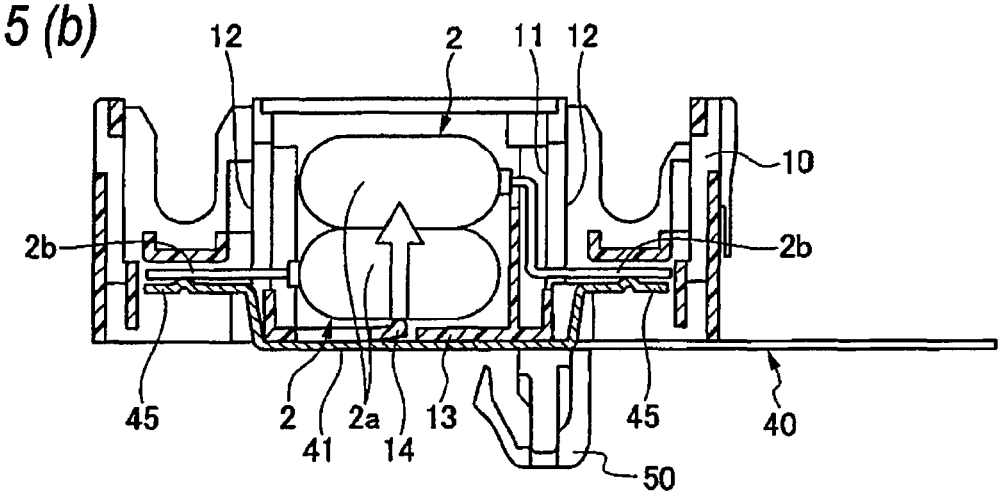
Figure 5:
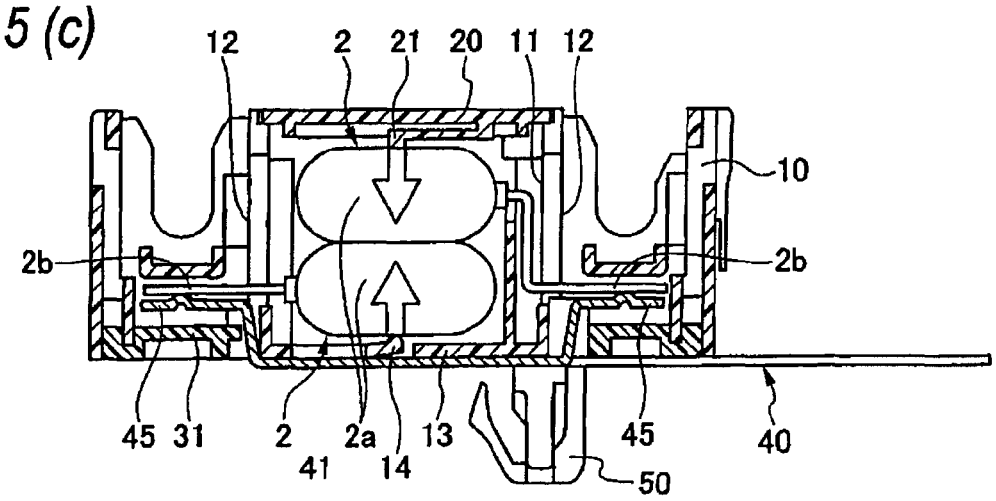
Figure 6:
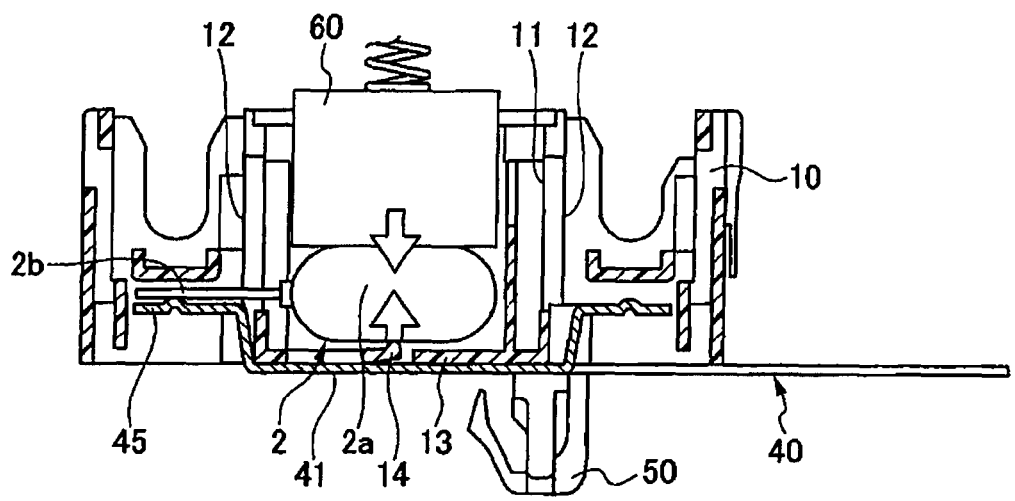
FIG. 6 are diagrams showing the embodiment of the invention, in which (a) and (b) are sectional diagrams showing respective processes for housing a single capacitor.
Figure 6:
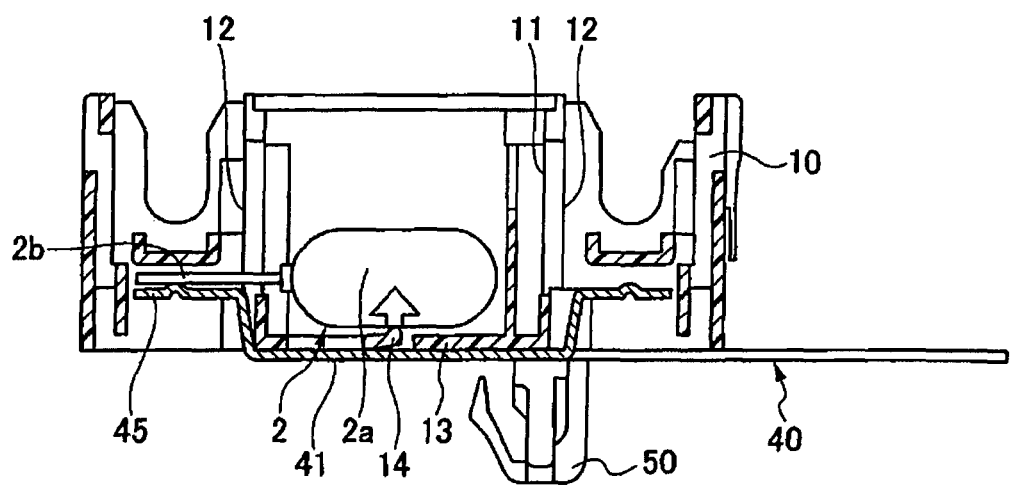
Figure 7:
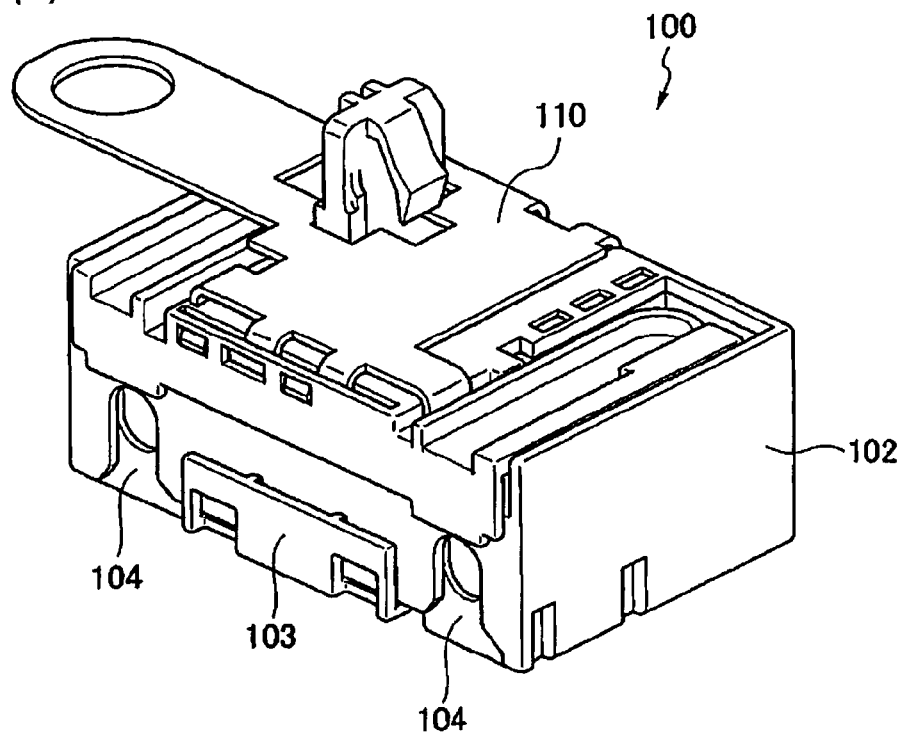
FIG. 7 are diagrams showing an example of a related art, in which (a) is a perspective view of an electronic part housing box seen from the bottom surface side thereof and (b) is a perspective view of the electronic part housing box seen from the upper surface side thereof.
Figure 7:
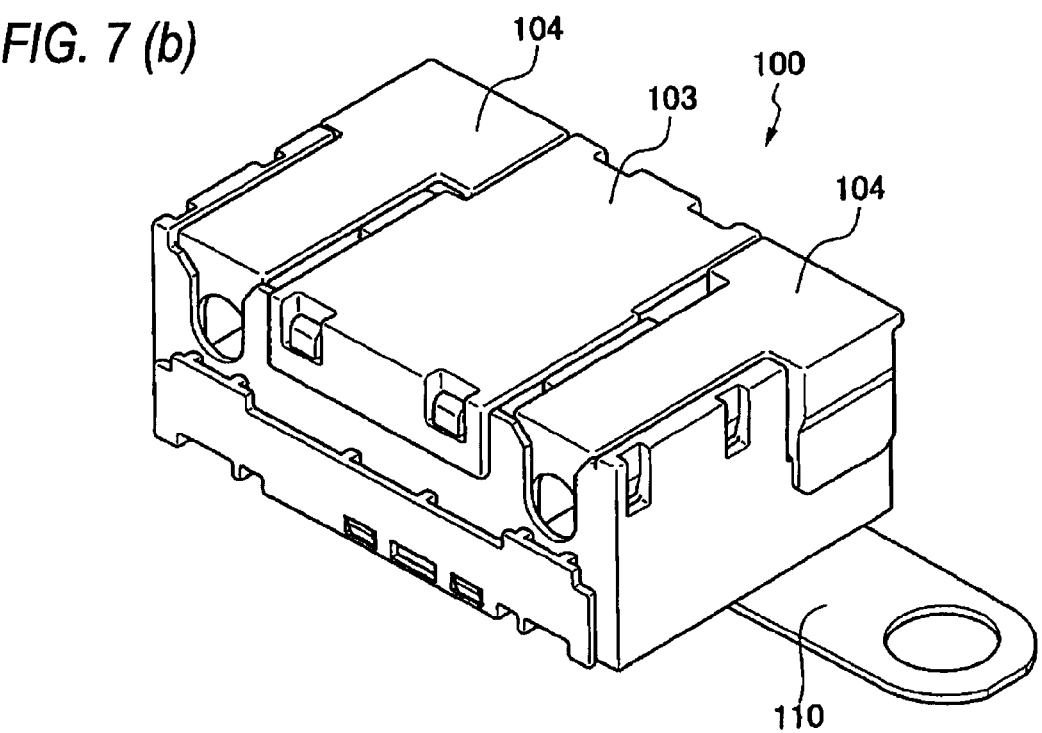
Figure 8:
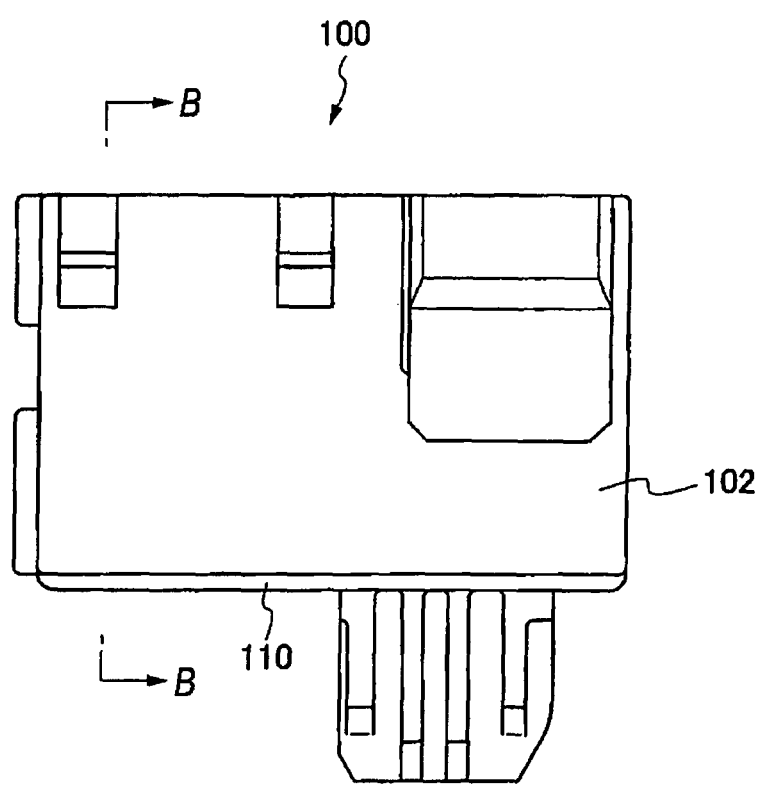
FIG. 8 is a side view of the electronic part housing box according to the example of the related art.
Figure 9:
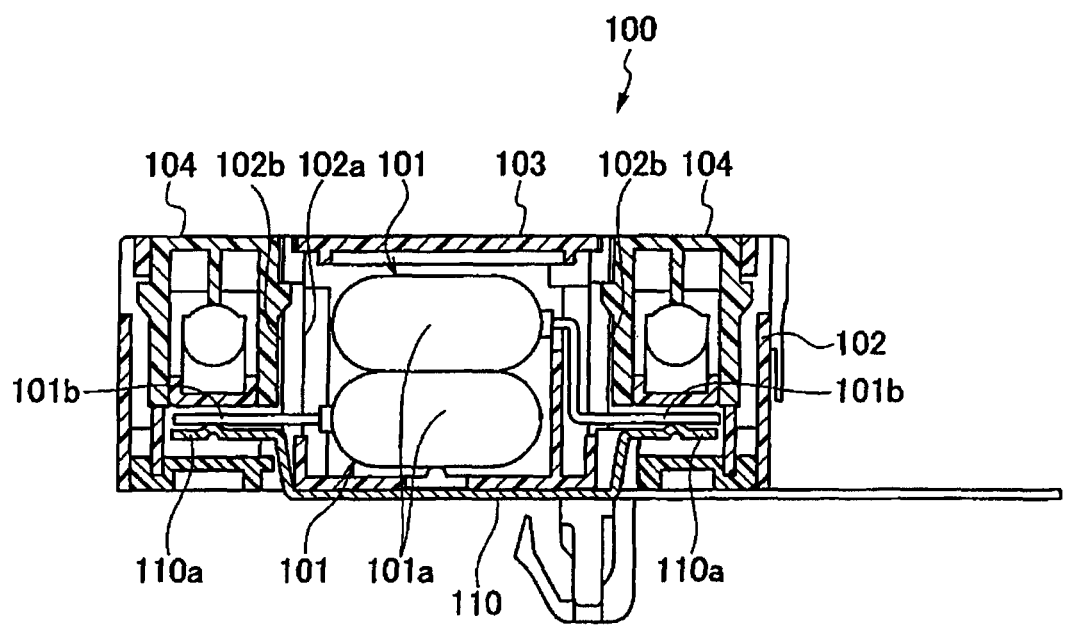
FIG. 9 is a sectional view cut along a line B-B in FIG. 8.

FIGS. 1 to 6 show the embodiment of the invention. FIG. 1(a) is a perspective view of an electronic part housing box 1 seen from the bottom surface side thereof, FIG. 1(b) is a perspective view of the electronic part housing box 1 seen from the upper surface side thereof, FIG. 2 is a sectional view cut along a line A-A in FIG. 1(b), FIG. 3 is a perspective view of a base member 10, FIG. 4 is a perspective view of a part housing cover 20, FIGS. 5(a) to (c) are sectional views showing respective processes for housing two capacitors 2, and FIGS. 6(a) and (b) are sectional views showing respective processes for housing the capacitor 2.

As shown in FIGS. 1 to 3, the electronic part housing box 1 includes the two capacitors 2 each as an electronic part, a base member 10 for housing the capacitors 2, a part housing cover 20 serving as a cover to be attached to the base member 10, two electric wire supporting members 30 attached to the base member 10, a noise filter cover 31 attached to the base member 10, a bracket 40 as a conductive member to be attached to the base member 10, and an engagement clip 50 slidably attached to the bracket 40.

Each of the capacitors 2 is configured by a capacity main body 2a as a part main body and a pair of lead wires 2b protruded from the capacity main body 2a.

The base member 10 is formed by insulative composite resin. The base member 10 is provided with a part housing chamber 11 and two electric wire housing chambers 12 disposed at the both sides thereof. The height of the part housing chamber 11 is set to be twice the maximum height of the capacitor 2. That is, according to the embodiment, the part housing chamber can house the two capacitors 2 at the maximum. Bottom walls 13 are provided at suitable portions on the bottom surface of the part housing chamber 11. A first spring portion 14 is provided integrally with the bottom wall 13 so as to extend from a portion thereof. The first spring portion 14 has a cantilever type supporting structure and is configured to protrude gradually from the bottom surface thereof on the opening side of the part housing chamber 11 toward the tip end side from the base end side thereof (see FIG. 3). The two capacitors 2 are housed in a vertically laminated state within the part housing chamber 11.

The part housing cover 20 covers the opening of the part housing chamber 11. A second spring portion 21 is integrally provided at the inner surface of the part housing cover 20. The second spring portion 21 has a cantilever type supporting structure and is configured to protrude on the bottom surface side of the part housing chamber 11 gradually toward the tip end side from the base end side thereof (see FIG. 4). The part housing cover 20 has engagement holes 22 at suitable portions, respectively. Each of the engagement holes 22 is fitted into the base member 10, whereby the part housing cover 20 is attached to the base member 10.

Electric wires (not shown) are penetrated through each of the electric wire housing chambers 12. A crimp-type terminal (not shown) is attached to each of the electric wires (not shown) within the electric wire housing chamber 12. A portion between the conductive line of the electric wire (not shown) and the crimp-type terminal (not shown) is made conductive.

Each of the electric wire supporting members 30 is disposed so as to support both the electric wire (not shown) and the crimp-type terminal (not shown) and to close the opening of the electric wire housing chamber 12.

On the bottom surface side of each of the electric wire housing chambers 12, the ground terminal portion 45 for the bracket 40 is disposed and a relay terminal for the electric wire (not shown) is housed. The electric wire relay terminal (not shown) is supported by the base member 10. The electric wire relay terminal (not shown) is fitted into the crimp-type terminal (not shown) during a process of housing the electric wire. Thus, the electric wire (not shown) is electrically coupled to the electric wire relay terminal (not shown) via the crimp-type terminal (not shown).

The bracket 40 is formed by processing a conductive metal plate member. The bracket 40 includes a part cover portion 41 and a vehicle body attachment portion 42 which protrudes toward the side direction from the part cover portion 41. Engagement holes 43 are provided at suitable portions of the part cover portion 41, respectively. Each of the engagement holes 43 is engaged with the base member 10. A slide hole 44 is provided at the part cover portion 41. Two ground terminal portions 45 are provided in a protrusive manner at the part cover portion 41. The ground terminal portions 45 are introduced into the two electric wire housing chambers 12, respectively.

Engagement clip 50 is formed by composite resin. The engagement clip 50 is inserted into the slide hole 44 of the bracket 40 and attached thereto in a manner that the clip is sandwiched between the bracket 40 and the base member 10 at an insertion completion position.

The pair of lead wires 2b of each of the capacitors 2 are introduced into corresponding one of the electric wire housing chambers 12. To be concrete, the pair of lead wires 2b of one of the capacitors 2 are introduced into one of the electric wire housing chambers 12, whilst the pair of lead wires 2b of the other capacitor 2 are introduced into the other electric wire housing chamber 12. The pair of lead wires 2b of each of the capacitors 2 are fixed to the ground terminal portion 45 of the bracket 40 and the electric wire relay terminal (not shown) by means of the welding etc., respectively.

The electronic part housing box 1 configured in this manner is fixed to the vehicle body (not shown) by using the bracket 40 and the engagement clip 50. That is, the bracket 40 of the electronic part housing box 1 is grounded to the vehicle body (not shown). Since the capacitors 2 are disposed between the electric wires (not shown) and the ground, respectively, when noise is superimposed on an electric signal transmitted through the electric wire (not shown), this noise can be eliminated by the capacitor 2 utmostly.

Next, the explanation will be made as to a procedure in the case of housing the two capacitors 2 in the base member 10. As shown in FIG. 5(a), the two capacitors 2 are sequentially inserted into the part housing chamber 11 from the opening thereof. When the two capacitors 2 are inserted into the part housing chamber 11, the capacity main body 2a at the lower position is placed on the first spring portion 14. A pressing jig 60 is inserted into the part housing chamber 11 from the opening thereof to thereby move the capacity main body 2a at the lower position to a predetermined position against the biasing force of the first spring portion 14. Then, a welding rod etc. is inserted into the electric wire housing chamber 12 from the opening thereof to thereby fix between one of the lead wires 2b of the each capacitor 2 and the ground terminal portion 45 of the bracket 40 and between the other wire 2b of the each capacitor 2 and the electric wire relay terminal (not shown) by means of the welding etc.

As shown in FIG. 5(b), after fixing the lead wires 2b by means of the welding etc., the pressing jig 60 is removed from the part housing chamber 11. As a result, the two capacity main bodies 2a slightly move upward within the part housing chamber 11 due to the biasing force of the first spring portion 14.

Next, as shown in FIG. 5(c), the part housing cover 20 is attached to the base member 10 to thereby close the opening of the part housing chamber 11, whereby the procedure is completed. When the part housing cover 20 is attached, the second spring portion 21 of the part housing cover 20 biases the capacity main body 2a at the upper position downward, whereby the two capacity main bodies 2a respectively move to positions where the biasing force of the first spring portion 14 and the biasing force of the second spring portion 21 are balanced. The two capacity main bodies 2a are housed in the part housing chamber in a state that there is no gap between the two capacity main bodies 2a, between the capacity main body 2a at the lower position and the first spring portion 14 of the base member 10, and between the capacity main body 2a at the upper position and the second spring portion 21 of the part housing cover 20.

Next, the explanation will be made as to a procedure in the case of housing the single capacitor 2 in the base member 10. As shown in FIG. 6(a), the single capacitor 2 is inserted into the part housing chamber 11 from the opening thereof. When the capacitor 2 is inserted into the part housing chamber 11, the capacity main body 2a is placed on the first spring portion 14. The pressing jig 60 is inserted into the part housing chamber 11 from the opening thereof to thereby move the capacity main body 2a to a predetermined position against the biasing force of the first spring portion 14. Then, the welding rod etc. is inserted into the electric wire housing chamber 12 from the opening thereof to thereby fix between one of the lead wires 2b of the capacitor 2 and the ground terminal portion 45 of the bracket 40 and between the other wire 2b of the capacitor 2 and the electric wire relay terminal (not shown) by means of the welding etc.

As shown in FIG. 6(b), after fixing the lead wires 2b by means of the welding etc., the pressing jig 60 is removed from the part housing chamber 11. As a result, the capacity main body 2a slightly moves upward within the part housing chamber 11 due to the biasing force of the first spring portion 14.

At the last, the part housing cover 20 is attached to the base member 10 to thereby close the opening of the part housing chamber 11, whereby the procedure is completed.

According to the electronic part housing box 1 thus configured, when the capacitors 2 of the maximum housing number are housed in the part housing chamber 11 (that is, when the two capacitors are housed in this embodiment), the capacity main bodies 2a can be housed within the part housing chamber 11 without causing any gap substantially even in the case where the capacitors which each capacity main body 2a has a height smaller than the maximum size are housed. Thus, the vibration of the capacity main bodies 2a can be effectively prevented. Also, even in the case where the capacitors 2 of the number less than the maximum housing number are housed in the part housing chamber 11 (that is, when the single capacitor is housed in this embodiment), the vibration can be suppressed as compared with the example of the related art where the capacitor is housed in a free state without acting any biasing force thereon. As described above, the invention can prevent utmostly such the problem that the capacity main body 2a vibrates to apply a large load to the portions of the lead wires 2b fixed to the bracket 40 etc. to thereby break the lead wires 2b.

The first spring portion 14 is provided integrally with the base member 10. Thus, the vibration of the capacity main body 2a can be suppressed utmostly without increasing the number of parts.

The part housing cover 20 is provided with the second spring portion 21 for biasing the capacity main body 2a toward the bottom surface side of the part housing chamber 11. Thus, when the two capacitors 2 of the maximum housing number are housed in the part housing chamber 11, the capacity main bodies 2a are respectively disposed at the positions where the biasing force of the first spring portion 14 and the biasing force of the second spring portion 21 are balanced even in the case where the capacitor which capacity main body 2a has a height smaller than the maximum size is housed. Accordingly, the vibration of the capacity main bodies 2a can be suppressed further effectively.

In this embodiment, although the part housing chamber 11 is configured to have a height capable of housing the two capacitors 2, the invention can also be applied to a case where the part housing chamber is configured to have a height capable of housing the three or more capacitors.

The second spring portion 21 is provided integrally with the part housing cover 20. Thus, the vibration of the capacity main body 2a can be suppressed utmostly without increasing the number of parts.

In this embodiment, although the capacitor 2 is use as the electric part, the invention can attain similar effects even in a case of employing a part with lead wires other than the capacitor 2 as the electric part.

What is claimed is:

1. An electronic part housing box, comprising:
   an electronic part which has a lead wire protruded from a main body of the part;
   a base member which has a part housing chamber for housing the part main body;
   a part housing cover which is attached to the base member so as to cover an opening of the part housing chamber; and
   a conductive member which is attached to the base member to thereby fix the lead wire, wherein the base member is provided with a first spring portion which biases the part main body toward the opening side of the part housing chamber.

2. The electronic part housing box according to claim 1, wherein the first spring portion is integrally provided with the base member.

3. The electronic part housing box according to claim 1 or 2, wherein the part housing cover is provided with a second spring portion for biasing the part main body toward a bottom surface side of the part housing chamber.

4. The electronic part housing box according to claim 3, wherein the second spring portion is integrally provided with the part housing cover.

\* \* \* \* \*